March 4, 1969  O. G. GARNER  3,430,330
METHOD OF MAKING ALUMINUM SHEATHED COAXIAL CABLE
Filed Dec. 30, 1965

INVENTOR
OSCAR G. GARNER
BY
ATTORNEYS.

United States Patent Office 3,430,330
Patented Mar. 4, 1969

3,430,330
METHOD OF MAKING ALUMINUM SHEATHED COAXIAL CABLE
Oscar G. Garner, Westfield, N.J., assignor to General Cable Corporation, New York, N.Y., a corporation of New Jersey
Filed Dec. 30, 1965, Ser. No. 517,706
U.S. Cl. 29—429      9 Claims
Int. Cl. B23p *19/00;* B23k *31/06*

ABSTRACT OF THE DISCLOSURE

This specification discloses a method of making metal sheathed coaxial cable with plastic foam insulation. The outer conductor is formed as a longitudinally seamed tube of larger diameter than the plastic insulation of the core and is welded while at its large diameter, and the cable is then drawn through a stationary die which reduces the diameter of the sheath sufficiently to squeeze the plastic insulation. The welding and sizing are done at closely spaced stations to that restraint at the welding station damps movement of the sheath as it enters the die. The sheath is flooded with lubricant as it enters the die and the lubricant is removed before the sheath reaches the apparatus for pulling the cable through the die. The squeeze of the foam is limited to a value that maintains a minimum structural return loss.

Background and summary of the invention

It is an object of the invention to provide a method of making a metal-sheathed coaxial cable of greater mechanical strength and of more uniform electrical properties along its length.

Coaxial cables have a conductor core surrounded by electrical insulation, and the insulation is enclosed in a conducting sheath. Cables have been made by forming the sheath around the insulated core and welding the sheath progressively, but this is difficult without damaging the insulation. When the sheath has been formed and welded as a tube of substantially larger diameter than the insulation on the conductor core, so as to keep the welding operation spaced from the insulation, subsequent reduction of the sheath diameter presented serious problems.

This invention provides a method in which the sheath is formed and welded as a tube of larger diameter than the insulation, and in which the sheath is then drawn down in a stationary sizing die with a short distance between the region of welding and the sheath diameter reduction so that there is a minimum distance in which the core moves at a faster rate than the sheath. This eliminates friction between the sheath and insulation which would affect the uniformity of the properties of the insulation.

The drawdown of this invention uses a sizing die and allows for control of the mechanical properties of the sheath to get higher strength; and it also provides for accurate control of the squeeze of the insulation by the sheath, a very important consideration in the electrical properties of the insulation, especially when foam insulation is used.

Other objects, features and advantages of the invention will appear or be pointed out as the description proceeds.

Brief description of the drawings

In the drawing, forming a part hereof, in which like reference characters indicate corresponding parts in all the views.

Description of the preferred embodiments

Figure 1:
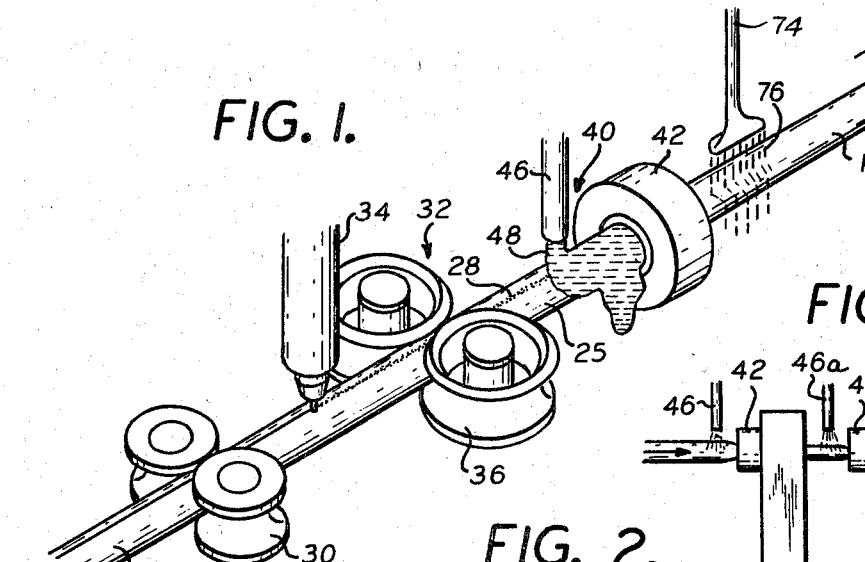
FIGURE 1 is a diagrammatic, isometric view showing a portion of the method and apparatus for carrying out the method of this invention.

An insulated conductor core 10 is fed to a forming station 12 where a flat metal sheathing 14 is progressively formed into a tube around the conductor core 10. This forming of the metal sheath 14 is done in a forming die 16 which is merely representative of means for bending a flat strip into a tube with a longitudinal seam.

Figure 6:
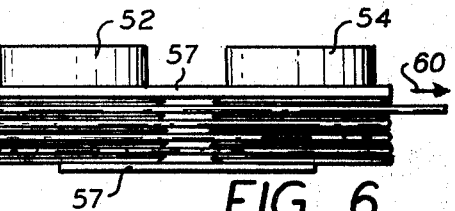
FIGURES 6, 7 and 8 are greatly enlarged sectional views taken on the lines 6—6, 7—7 and 8—8, respectively, of FIGURE 2.

The conductor core 10 has a center conductor 20 (FIGURE 6) surrounded by electrical insulation 22. This electrical insulation is preferably a plastic foam such as polyethylene having a percent of air of about 45 to 55. These values are given by way of illustration. For a particular cable, the plastic foam is kept substantially uniform along the entire length of the cable since variations in the density of the foam, or other physical characteristics, affect the electrical characteristics of the cable.

The radial thickness of the insulation 22 depends upon the diameter of the conductor 20 and is preferably at least one and one-half times as great as the diameter of the conductor. The radial thickness of the insulation 22 is preferably within a tolerance of 0.002 inch, throughout the length of the cable, for conductor cores of less than one half inch in diameter, and the tolerance is somewhat greater for larger diameters.

Figures 7, 8:
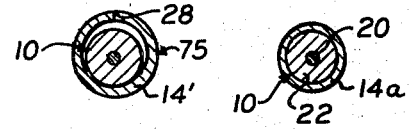

The cable consisting of the conductor core 10, surrounded by the formed metal sheath 14, is indicated by the reference character 25. The formed sheath or tube, designated as 14' in FIGURE 7, is of substantially larger diameter than the conductor core 10. The tube 14' has a longitudinal seam 28 which is spaced from the insulation of the conductor core 10, so that the seam can be welded without damage to the insulation of the conductor core.

Beyond the forming die 16, the cable 25 travels through a roll stand 30 at a welding station 32. There is a torch 34 at the welding station in position to weld the seam 28 as the cable 25 travels from the roll stand 30 to another roll stand 36, spaced closely behind the roll stand 30 at the welding station 32.

Close behind the roll stand 36, there is a sizing station 40 which includes a bell or sizing die 42, carried by a supporting frame 44, and there is a pipe 46 immediately in front of the bell or sizing die 42 for pouring a lubricant 48 (best shown in FIGURE 1) over the outside of the cable sheath 14'.

The sizing and sinking is done by a single stationary die 42 or by multiple dies. The die or dies are detachable from the supporting frame 44 so that dies of other size can be substituted when operating with different sizes of cables or when a different degree of drawdown is desired for a cable of the same size.

The sizing station 40 is located close to the forming station 12 and welding station 32 so that the same attendant can inspect both the welding and the sizing operations. This distance is preferably not greater than about 8 feet. The die is about 2 to 4 feet beyond the torch 34.

Another advantage of the close proximity of the welding and sizing stations is that the roll stand 36 at the welding station, in addition to positioning the cable accurately for welding, serves also as a pair of damping rolls to minimize the effect of any movement of the cable 25 as it enters the sizing die 42. This obtains more uniform production, especially since slight movements of the order of 0.005 to 0.010 inch at the welding point, seriously affect the quality of the weld.

Another important advantage of having the forming and welding station close to the sizing station is that the conductor core 10 moves faster than the tube 14' before the tube has passed through the sizing die 42. This is because the conductor core 10 advances at the same speed as the reduced-diameter portion of the tube beyond the sizing die, and because of the elongation of the tube in the sizing die 42, the lineal speed of the tube ahead of the sizing die is less than that beyond the sizing die. The tube beyond the sizing die 42 is indicated by the reference character 14a.

At regions where the conductor core 10 and the sheath tube 14' move at different speeds, there is friction between contacting surfaces of the conductor core 10 and the sheath tube 14'. This friction contact is against certain areas of the conductor core and not against the upper areas where there is clearance between the conductor core and the tube. It is, therefore, desirable to reduce to a minimum the travel of the conductor core 10 while in contact with the tube and moving at a different speed from the tube so as to avoid wear, and especially uneven wear, of the insulation.

As the tube or sheath 14' is drawn down tight around the conductor core, the friction increases and it is desirable to have this operation done in as short a length as possible so that the core and sheath can be brought to the same speed promptly where relative movement no longer occurs. This makes the use of the stationary sizing die 42 advantageous because such dies effect a drawdown in a short tube length.

The reduction in the diameter of the tube or sheath 14' in the sizing die 42 is preferably between about 5% to 40%; the amount of reduction depending upon the original width of the metal sheath 14 as compared to the circumference of the conductor core 10. It is desirable that the tube 14' be reduced sufficiently to contact the conductor core 10 around the entire circumference of the core and it is preferable that the sheath impart some squeeze to the insulation on the conductor core. The reduction of the tube or sheath 14' in the sizing die is preferably a cold working of the metal so that the operation improves the mechanical properties of the sheath by imparting to it a higher strength. The preferred material for the sheath is aluminum, but other metals can be used. Copper is a suitable substitute for the aluminum, but adds somewhat to the cost and weight.

The wall thickness of the metal sheath is not reduced by its passage through the sizing die 42 and the effect of the die is merely to lengthen the tube as the diameter reduces. This is a "sinking" operation as differentiated from a "drawing" process which would reduce the sheath thickness as well as its size. It is, of course, necessary to use metal strip of a composition and temper which will elongate in the die 42 in the manner required by the method of this invention.

Starting with fully annealed aluminum of the electrical conductive grade, the working in the die 42 results in a harder tube; up to medium or half hard depending upon the diameter reduction.

The effect of squeeze of the insulation 22 by the drawn down sheath of the cable 14a on the electrical properties of the insulation, is critical. Excessively squeezed cores produce poor SRL (structural return loss) values which drop sharply with increase in squeezing. The squeeze for a core of approximately one half inch in diameter, with a .098 inch conductor, should not be above about 15 mils. The squeeze also affects the impedance value, higher squeezing resulting in lower impedance and a lighter squeeze resulting in higher impedance. To obtain the desired electrical properties, therefore, the cable core must be properly designed in accordance with the intended reduction in diameter of the sheath after welding and with a range of squeeze between about 5 and 15 mils. Minimum SRL is 26 db and preferably about 32 db for 8 to 220 megacycles.

A more highly squeezed core requires more force to pull or slip the sheath over the core. With this invention, a pull of seventy pounds per 6 inches of the core to move it axially with respect to the sheath in the final cable, the test being made by cutting back a portion of the sheath, indicates a desirable degree of squeeze with a core diameter of about one half inch. For other cable sizes, the force is directly proportional to the core diameter. The insulation sticks to the center conductor and does not pull away from it as the result of sudden changes in outer temperature.

Figure 2A:
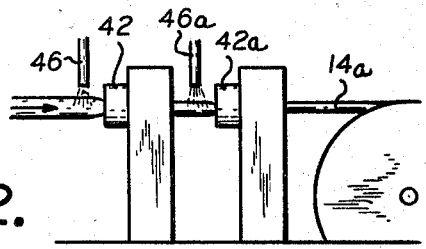
FIGURE 2a is a fragmentary view showing a modification of FIGURE 2.
Figure 2:
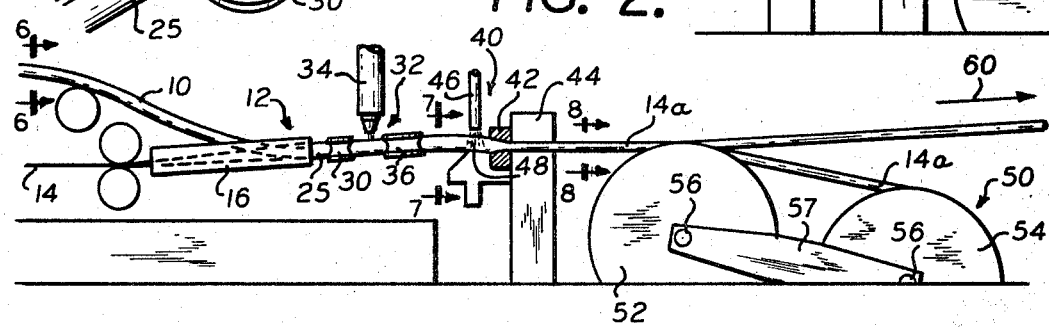
FIGURE 2 is a diagrammatic side elevation showing the apparatus of FIGURE 1 and also showing the forming of the sheath and the manner in which the sheath is pulled to advance it through the sizing die.
Figure 3:
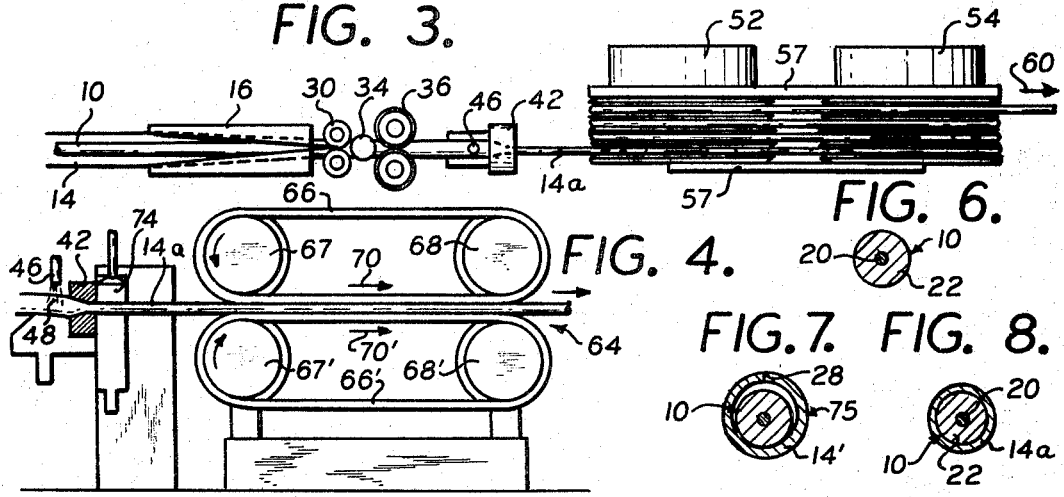
FIGURE 3 is a top plan view of the apparatus shown in FIGURE 2.

FIGURES 2 and 3 show a capstan 50 for pulling the cable 14a with sufficient force to advance the welded sheath continuously through the sizing die 42 at uniform speed.

The capstan 50 includes two drums 52 and 54, mounted for rotation about parallel axles 56 carried by a fixed frame 57. The drums 52 and 54 preferably have suitable grooves for receiving the cable 14a, and the drums 52 and 54 are driven by power with any conventional capstan drive. A pull is exerted on the cable 14a, where it comes off the capstan, as indicated by the arrow 60, so as to keep the convolutions of the cable 14a tight on the drums and because of the substantial length of the cable on the drums 52 and 54 and the angular wrap of the cable around the drums, a substantial friction is developed which advances the cable with uniform speed and without slippage on the drums 52 and 54, even though the outside of the cable remains coated with lubricant from the lubricant supply pipe 46.

Figure 4:
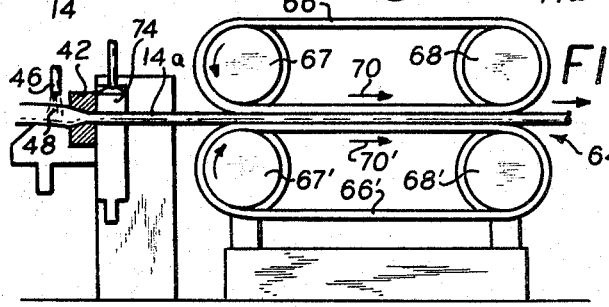
FIGURE 4 is a fragmentary view, similar to a portion of the structure shown in FIGURE 2, but showing a modified construction of the apparatus for pulling the cable.
Figure 5:
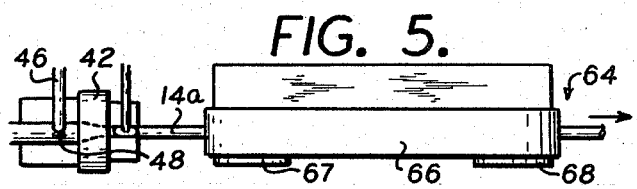
FIGURE 5 is a top plan view of the apparatus shown in FIGURE 4.

FIGURES 4 and 5 show a different construction of the apparatus for pulling the sheath tube through the sizing die 42. Instead of the drum capstan, the apparatus illustrated in FIGURES 4 and 5 uses a caterpillar capstan 64. This includes an upper endless belt 66 which passes around wheels 67 and 68, driven by power and located in such position that the lower run of the belt 66, which is moving in the direction of the arrow 70, contacts with the cable 14a.

The caterpillar capstan 64 includes a similar endless belt 66' which runs on wheels 67' and 68' driven by power and located in position to have the upper run of the belt 66' contact with the cable 14a to move it in the direction of the arrow 70'.

The belts 66 and 66' are pressed against the cable 14a with sufficient force to develop substantial friction but because of the reduced area of contact and the lack of snubbing effect as compared with the round or drum capstan 50, the caterpillar capstan 64 does not have as much friction and it is desirable to remove any lubricant from the cable 14a before gripping it with the capstan 64.

In order to remove the lubricant 48 from the cable 14a, there is a spray nozzle 74 located just beyond the die 42 in position to direct a plurality of liquid streams 76, best shown in FIGURE 1, against the cable 14a. These liquid streams 76 are sufficient in number and are of enough force to wash off the lubricant 48 around the entire circumference of the cable 14a. Strong water streams can be used, or streams of liquid having some solvent action can be substituted, if desired.

The preferred embodiments of the invention have been illustrated and described, but changes and modifications can be made and some features can be used in different

What is claimed is:

1. The method of making coaxial cable having a conductor sheath over a plastic foam-insulated center core conductor, which method comprises advancing the insulated core axially with continuous motion, progressively forming a sheath as a longitudinal seam tube surrounding the core and of larger inside diameter than the outside diameter of the insulated core, welding the seam of the sheath while the diameter of the sheath remains larger than that of the core, and while the core and sheath continue to advance with continuous motion beyond the region of welding, drawing down the sheath to a reduced diameter that brings the inside of the sheath into contact with the outside surface of the foam insulation on the core, and pulling the cable continuously beyond a region of drawdown to provide power for the drawdown and to keep the sheath and core advancing with continuous motion.

2. The method described in claim 1 characterized by the sheath being drawn down by passage through a stationary die and being drawn down in the die to a diameter small enough to squeeze the foam insulation on the core between about 5 and 15 mils.

3. The method of making coaxial cable having a conductor sheath over a plastic foam-insulated center core conductor, which method comprises advancing the insulated core axially with continuous motion, progressively forming a sheath as a longitudinal seam tube surrounding the core and of larger inside diameter than the outside diameter of the insulated core, welding the seam of the sheath, and while the core and sheath continue to advance with continuous motion, drawing down the sheath to a reduced diameter that brings the inside of the sheath into contact with the outside surface of the insulation on the core, and pulling the cable continuously beyond a region of drawdown to provide power for the drawdown and to keep the sheath and core advancing with continuous motion, and characterized by the sheath being drawn down by passage through a stationary die and being drawn down in the die to a diameter small enough to squeeze the insulation, and further characterized by applying lubricant to the outside of the welded sheath just before it enters the stationary die, removing the lubricant from the sheath just beyond the die, and exerting the pull on the cable beyond the region of lubricant removal by gripping the sheath from opposite sides by friction forces moving in the direction of the length of the sheath.

4. The method described in claim 2 characterized by advancing the cable by pulling convolutions of the cable around arcs of contact with a capstan, and applying power to rotate the capstan.

5. The method described in claim 1 characterized by the drawdown being performed close to the region of forming and welding and at locations where the forming, welding and sizing operations can be watched simultaneously by an attendant, and the sizing is done in a pass through a stationary die or dies, and damping movement of the sheath as it enters the stationary die by restraining movement of the sheath at the region of welding and locating the region of welding and sizing within an axial distance of about 2 to 5 feet, whereby the restraint at the region of welding is effective to damp movement of the sheath as it enters the stationary die.

6. The method described in claim 1 characterized by drawing down the sheath from its original diameter as of the time of welding to a final diameter that causes the sheath to squeeze the insulation of the core, the drawing down of the sheath being accomplished by pulling the cable through a single fixed die that performs the complete drawdown.

7. The method described in claim 6 characterized by drawing the sheath down to a diameter between 5 and 40% of the original diameter of the welded sheath.

8. The method described in claim 1 characterized by improving the strength of the sheaths by cold drawing it to a reduced diameter that squeezes the plastic insulation, and limiting the diameter reduction and resulting squeeze to maintain a minimum structural return loss of 26 db for a frequency of 8 to 220 megacycles.

9. The method described in claim 1 characterized by producing welds that are uniform in the direction of the lengths of the cable by correlating the welding heat with the speed of axial movement of the cable, and applying rolling forces against opposite sides of the sheath on both sides thereof close to the region of welding to damp any transverse movement of the sheath and restrict such transverse movement to less than about 0.010 inch.

References Cited

UNITED STATES PATENTS

| | | | |
|---|---|---|---|
| 2,087,057 | 7/1937 | Burgett | 29—429 |
| 2,088,446 | 7/1937 | Specht | 29—474.1 |
| 2,090,744 | 8/1937 | Boe | 29—474.1 |
| 2,644,353 | 7/1953 | McLaughlin | 29—202.5 X |
| 3,069,763 | 12/1962 | Reynolds | 29—429 |

THOMAS H. EAGER, *Primary Examiner.*

U.S. Cl. X.R.
29—202.5, 474.1; 174—102